United States Patent [19]

Heeks et al.

[11] Patent Number: 4,606,614

[45] Date of Patent: Aug. 19, 1986

[54] ACOUSTO-OPTIC ISOLATOR

[75] Inventors: John S. Heeks, Old Harlow; John D. Jackson, Harlow, both of England

[73] Assignee: International Standard Electric Corporation, New York, N.Y.

[21] Appl. No.: 438,670

[22] Filed: Nov. 2, 1982

[51] Int. Cl.[4] .............................................. G02F 1/11
[52] U.S. Cl. .................................................. 350/358
[58] Field of Search ............... 350/358, 96.11; 372/12, 372/13

[56] References Cited

U.S. PATENT DOCUMENTS 4,057,770  11/1977  Henningson et al. .......... 350/358 X
4,332,441  6/1982   Margolis ............................. 350/358
4,361,383  11/1982  McMahan, Jr. ................. 350/358 X

OTHER PUBLICATIONS

Hutcheson, "Integrated Optics: Showing Off Applications", Photonics Spectra, vol. 16, No. 4, Apr. 1982.
Smith et al., "Integrated Electrooptic Nonlinear Fabry-Perot Devices, Meeting on Int. & Guided Wave Optics, Jan. 1978.

Primary Examiner—John K. Corbin
Assistant Examiner—Vincent J. Lemmo
Attorney, Agent, or Firm—T. L. Peterson; J. S. Christopher

[57] ABSTRACT

An acousto-optic isolator for a semiconductor laser diode comprises a Fabry-Perot resonator tuned to the laser optical frequency $f_o$ followed by an acousto-optic Bragg diffraction device utilizing surface acoustic waves of frequency $f_a$ launched from a transducer. Light focussed by a lens to the load has a resultant frequency $f_o + f_a$. Any light reflected from the load suffers a further change in frequency to $f_o + 2f_a$ in the diffraction device and hence is blocked by the resonator. Undiffracted light can be detected at a photo-detector and used in a feedback control loop to stabilize the light source to the resonator.

5 Claims, 2 Drawing Figures

ACOUSTO-OPTIC ISOLATOR

BACKGROUND OF THE INVENTION

This invention relates to an acousto-optic isolator for use in optical transmission systems or optical sensor systems.

Semiconductor diode lasers are sensitive to changes in their output loading and it is therefore desirable to protect them from optical power reflected from the system. Hence the need for some sort of unidirectional optical isolator. Traditionally magnetic effects, such as Faraday rotation, are used in conjunction with polarisation filters to establish non-reciprocal behaviour in the optical path, but this mechanism is weak in normally used optical transmission media. Moreover, integrated optical solutions using this technique appear unlikely.

SUMMARY OF THE INVENTION

According to the present invention there is provided an acousto-optic isolator comprising an acousto-optic Bragg diffraction device in the output path of a monochromatic light source and, interposed between the device and the source an optical filter tuned to the optical frequency of the source.

The invention also provides a method of isolating a semiconductor diode light source from changes in the output loading comprising the steps of passing the diode output through an optical filter tuned to the diode output frequency and then through an acousto-optic Bragg diffraction means whereby the output light frequency is changed and any light reflected from the load has its frequency further changed by the diffraction means so as to be blocked by the filter.

BRIEF DESCRIPTION OF THE DRAWINGS

Embodiments of the invention will now be described with reference to the accompanying drawings, in which.

DESCRIPTION OF THE PREFERRED EMBODIMENT

Figure 1:
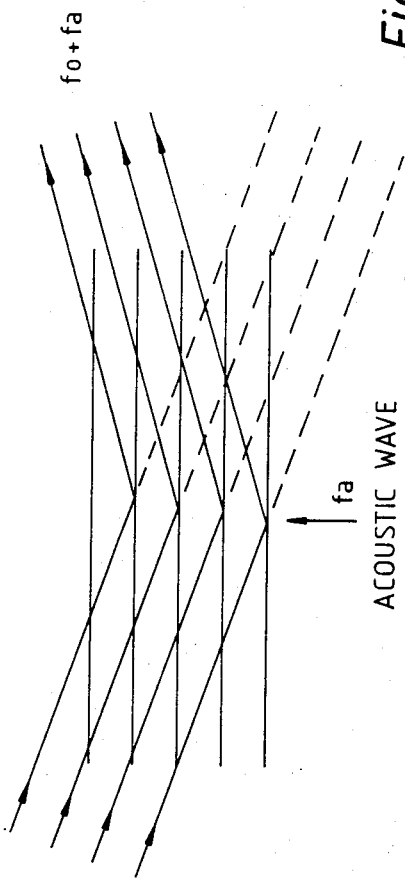
FIG. 1 illustrates the acousto-optic Bragg diffraction mechanism.

The present invention is based on the fact that an optical wave undergoing an acousto-optic Bragg diffraction has its optical frequency changed by the acoustic frequency. This mechanism is illustrated in FIG. 1 which shows how an optical wave of frequency $f_o$ incident at an angle to an acoustic wave of frequency $f_a$ has its optical frequency changed. As shown, if the optical wave is moving "against" the acoustic wave the optical frequency $f_o$ is translated to $f_o+f_a$. Only the first order mode is involved and it is possible to design devices where virtually all the input signal is diffracted into a single output. If now the diffracted output is reflected and retransmitted through the acousto-optic diffraction device the optical wave suffers a further change in frequency and is now at frequency $f_o+2f_a$.

Figure 2:
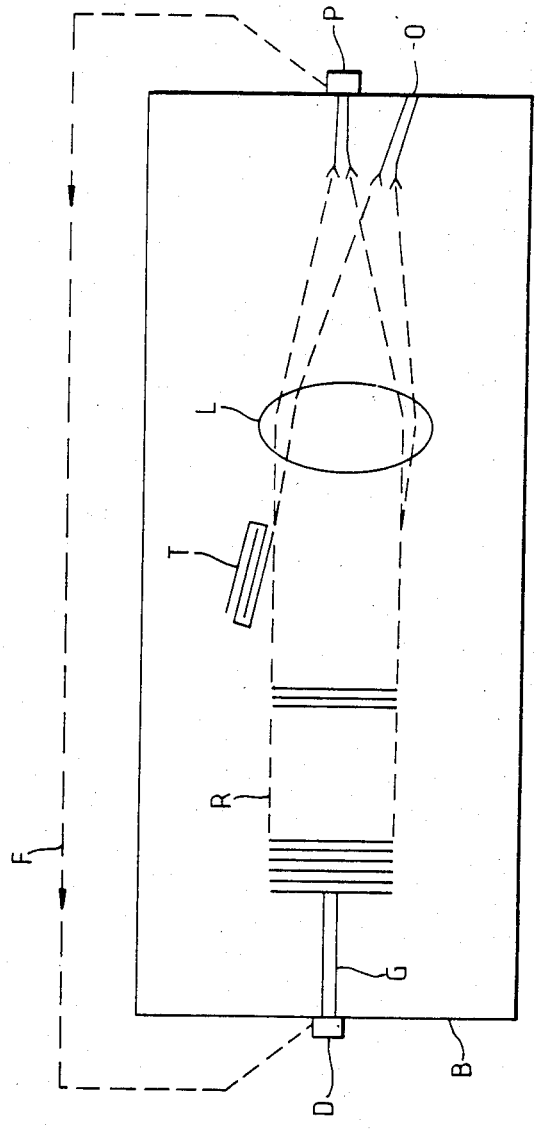
FIG. 2 illustrates an acousto-optic isolator.

The acousto-optic isolator shown in FIG. 2 makes use of this double change of frequency. Light from a semiconductor diode laser D is transmitted through a Fabry-Perot resonator R which is tuned to the optical frequency $f_o$ of the laser. Following the resonator there is an acousto-optic Bragg diffraction device B incorporating an electro-optic transducer T set at an angle to the optical path from the resonator. The transducer T is energised with an electrical signal of frequency $f_a$ so that a diffracting pattern is set up angularly across the optical path. Resulting from the diffraction mechanism an optical output of frequency $f_o+f_a$ is obtained, the resultant optical path diverging from the original path. The diffracted wave is conveniently focussed by a lens 1 for onward transmission via output O to whatever system the laser diode is powering. Any light reflected from the system passes back along the optical path to the diffraction device where it suffers a second change in frequency to $f_o+2f_a$. Light at this optical frequency will be rejected by the Fabry-Perot resonator tuned to $f_o$, thus isolating the diode from the reflections.

The Fabry-Perot resonator, the Bragg diffraction device and the lens are conveniently fabricated as an integrated optics device as shown in FIG. 2. A block B of lithium niobate has an optical waveguide structure G diffused into one surface region, leading to a Fabry-Perot resonator R fabricated in the same surface region. Following the resonator an interdigitated surface acoustic wave transducer T is deposited on the surface of the block. Beyond the transducer a lens L is fabricated by diffusion processes. The laser diode D is then affixed to the end of the block in alignment with the guide G.

However, in order to ensure that the laser diode frequency does itself not deviate by an appreciable amount compared with impressed modulation $f_a$ the diode must be stabilised to the same Fabry-Perot resonator. To achieve this a photodetector diode P is placed on the line of the original optical path and connected by a feedback control loop F to the laser diode drive circuitry. In this configuration it is deliberately arranged that not all the optical signal is diffracted in order that some unmodulated signal can fall on photodiode P. Light passing along this path has impressed on it the frequency discrimination characteristic of the Fabry-Perot resonator and hence, via the photodetector and the feedback control, the laser diode can be stabilised so that its frequency $f_o$ is pulled to the natural resonant frequency of the resonator.

To illustrate the practicality of this invention it is worth noting the following facts:

(i) Semiconductor diode lasers have been stabilised to 10 MHz long term stability with 3 MHz line width using a Fabry Perot cell of 150 MHz 3 dB resonant width.

(ii) A mirror reflection coefficient of 0.97 is appropriate to the above Fabry Perot response.

(iii) Using a 500 MHz acoustic driving signal the reflected optical wave is displaced by 1000 MHz and this would result in an excess of 20 dB isolation in the above resonator.

What is claimed is:

1. An optical isolator arrangement for a monochromatic light source comprising, in combination, an acousto-optic Bragg diffraction device in the output path of the light source, and an optical filter tuned to the optical frequency of the light source, the optical filter being interposed between the diffraction device and the light source, and further comprising means for detecting undiffracted light from the optical filter and feedback control means responsive to said detecting means for stabilizing the light source frequency with respect to the filter.

2. An arrangement as set forth in claim 1 wherein said optical filter is a Fabry-Perot resonator.

3. An arrangement as set forth in claim 1 wherein said Bragg diffraction device comprises a surface acoustic wave structure formed on the surface of an optically transparent piezo-electric body.

4. An arrangement as set forth in claim 1 wherein said optical filter and said Bragg diffraction device are together fabricated as an integrated optics structure in a body of lithium niobate.

5. An arrangement as set forth in claim 1 further comprising a focussing lens structure in the lithium niobate body for light which has passed through the optical filter and Bragg diffraction device.

* * * * *